(12) United States Patent
Svensson

(10) Patent No.: US 6,312,006 B1
(45) Date of Patent: Nov. 6, 2001

(54) TWO-AXLE VEHICLE SUSPENSION ARRANGEMENT

(75) Inventor: Roland Svensson, Väröbacka (SE)

(73) Assignee: Volvo Lastvagnar AB, Gothenburg (SE)

(*) Notice: Subject to any disclaimer, the term of this patent is extended or adjusted under 35 U.S.C. 154(b) by 0 days.

(21) Appl. No.: 09/529,950

(22) PCT Filed: Oct. 21, 1998

(86) PCT No.: PCT/SE98/01902

§ 371 Date: Apr. 21, 2000

§ 102(e) Date: Apr. 21, 2000

(87) PCT Pub. No.: WO99/20477

PCT Pub. Date: Apr. 29, 1999

(30) Foreign Application Priority Data

Oct. 21, 1997 (SE) .................................... 9703832

(51) Int. Cl.⁷ .................................... B60G 5/00
(52) U.S. Cl. .................... 280/683; 280/124.128; 280/124.158
(58) Field of Search .................... 280/677, 678, 280/683, 685, 124.111, 124.128, 124.13, 124.131, 124.132, 124.158, 124.153, 124.167, 124.156

(56) References Cited

U.S. PATENT DOCUMENTS

| | | |
|---|---|---|
| 2,903,256 | 9/1959 | Weiss . |
| 2,998,261 * | 8/1961 | Bartlett . |
| 4,132,432 | 1/1979 | Raidel . |
| 4,378,935 * | 4/1983 | Brown et al. ............. 267/64.27 |
| 4,756,550 * | 7/1988 | Raidel ..................... 280/713 |

FOREIGN PATENT DOCUMENTS 0 137 953   4/1985  (EP) .

* cited by examiner

Primary Examiner—Paul N. Dickson
(74) Attorney, Agent, or Firm—Young & Thompson

(57) ABSTRACT

Two-axle vehicle suspension arrangement with a support member (6), which supports the wheel axle (16) and is resiliently joined to a vehicle frame by an air spring (8, 9) at each end of the support member. The air springs are at different distances ($a_1$, $a_2$) to the axle. The spring force ($F_1$) of the air spring (8) closest ($a_1$) to the axle (16) has a greater spring force ($F_2$) than the other air spring.

4 Claims, 3 Drawing Sheets

TWO-AXLE VEHICLE SUSPENSION ARRANGEMENT

Figure 1:
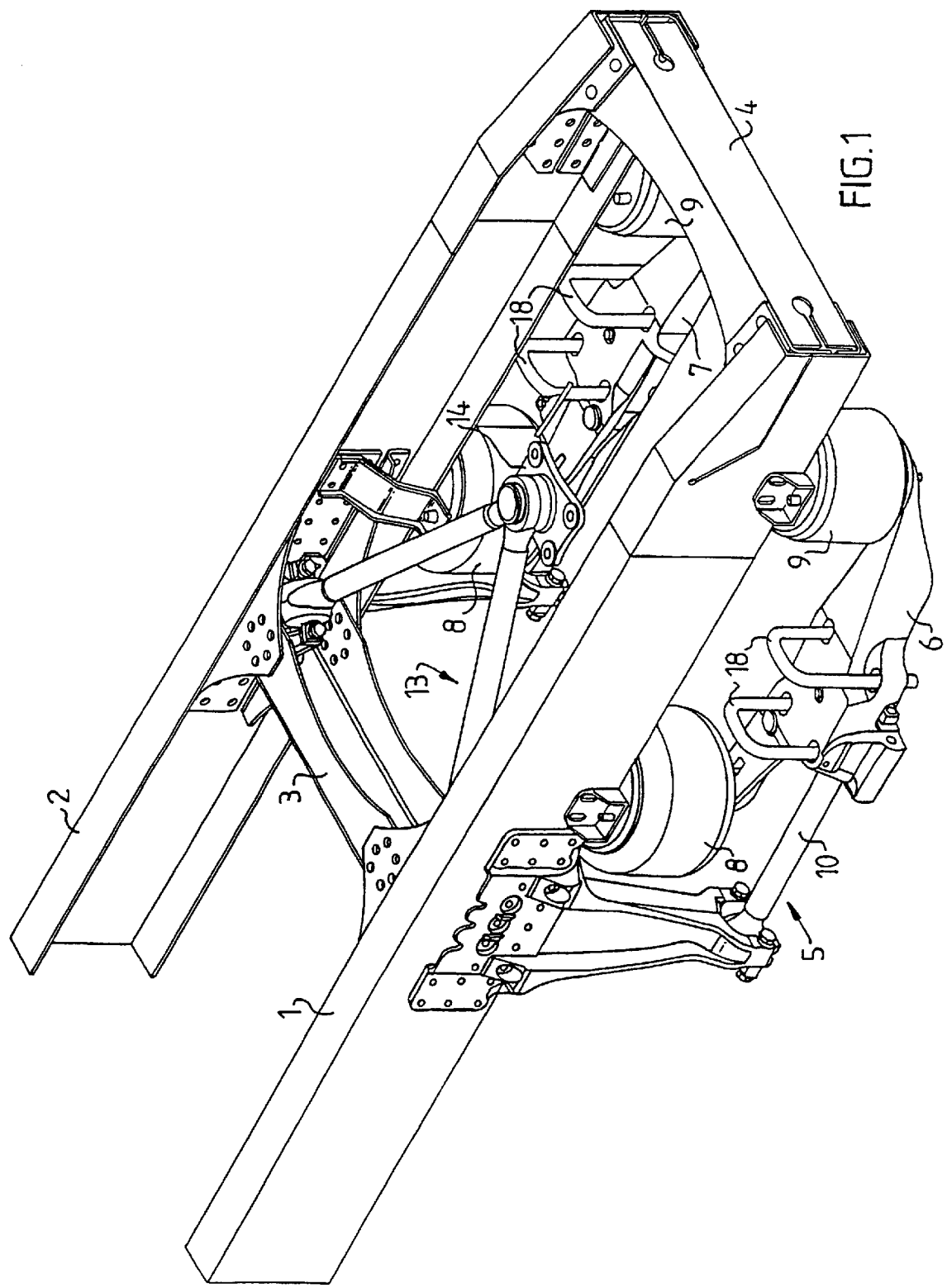

The present invention relates to a two-axle vehicle suspension arrangement, comprising a pair of support members for each axle, means for fixing the wheel axles between the ends of each support member, and spring elements disposed at or in the vicinity of the ends of the support members and joining the support members to a frame.

A commonly occurring wheel suspension arrangement with spring elements at either end of a support member has spring elements in the form of two identical air springs arranged symmetrically in relation to the axle position, i.e. the axle is arranged midway between two springs having the same spring force. The various parameters determining the length of the support arm include the desired spring properties and the space required by other system components.

For space reasons there may be a need to have a relatively short distance between the axle and the spring element on one side of the axle to provide space for other system components, while there is no corresponding requirement for space on the other side. If the larger space requirement on one side of the axle is made the determining dimension and the support member parts on either si equal length, then the deformation will be the same and balance will be obtained during the spring sequence, but at the same time this will result in a total length of the support member which is greater than what would be optimum if there were not differing space requirements on either side of the axle.

One method of avoiding this is to make the axle asymmetrical in relation to the spring mountings, as is known by EP-A-0 137 957. In this case the support member portion on one side of the axle has been extended relative to the support member portion on the other side of the axle, to provide space for a lifting device by means of which the wheel axle and thus the wheels can be raised from the road surface when the vehicle load is low. However, the air spring elements on either side of the axle are identical, i.e. they have the same spring force, and his results in imbalance during the spring action by uneven deformation in the spring elements due to moment arms of unequal length.

The purpose of the present invention is to achieve a wheel suspension arrangement of the type described by way of introduction, which makes it possible to reduce the total installation space required on the frame side, compared with known symmetrical wheel axle suspensions, at the same time as the problems with imbalance in previously known asymmetrical wheel axle suspension systems are eliminated.

This is achieved according to the invention by virtue of the fact that the wheel axles are fixed in an axle position asymmetrically between the outer ends of the support members, and that the support members of one axle are reversed in relation to the support members of the other axle, so that the spring elements located closest to the respective axle position are directed towards each other, the spring elements being so selected that the spring force of the spring elements located closest to the axle position is greater than the spring force of the other spring elements.

Preferably, the spring elements are selected so that the product of the spring force and the distance from the axle position to the point of attachment of the spring elements in the support member is at least approximately equal on both sides of the axle position, thus providing optimal spring properties.

The basic principle of the invention is particularly easy to apply to wheel suspensions with air springs, where the spring elements consists of cylindrical air cushions of elastic material. The spring forces of the air springs are adapted by selecting an area differential between the air cushions so that the difference between the effective cross sectional areas of the air cushions is inversely proportional to the difference between the distances to the axle.

Figure 2:
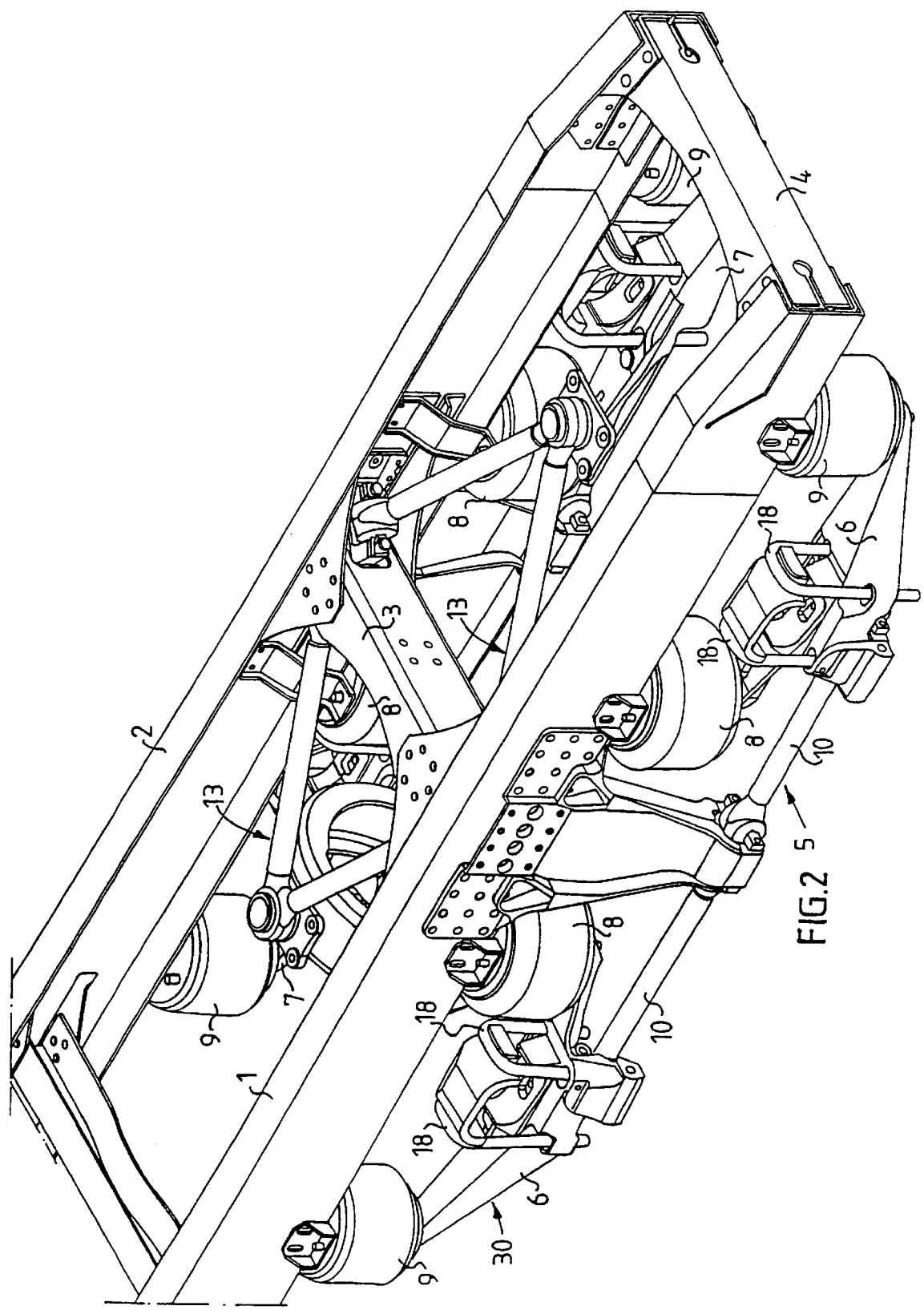
Figure 3:
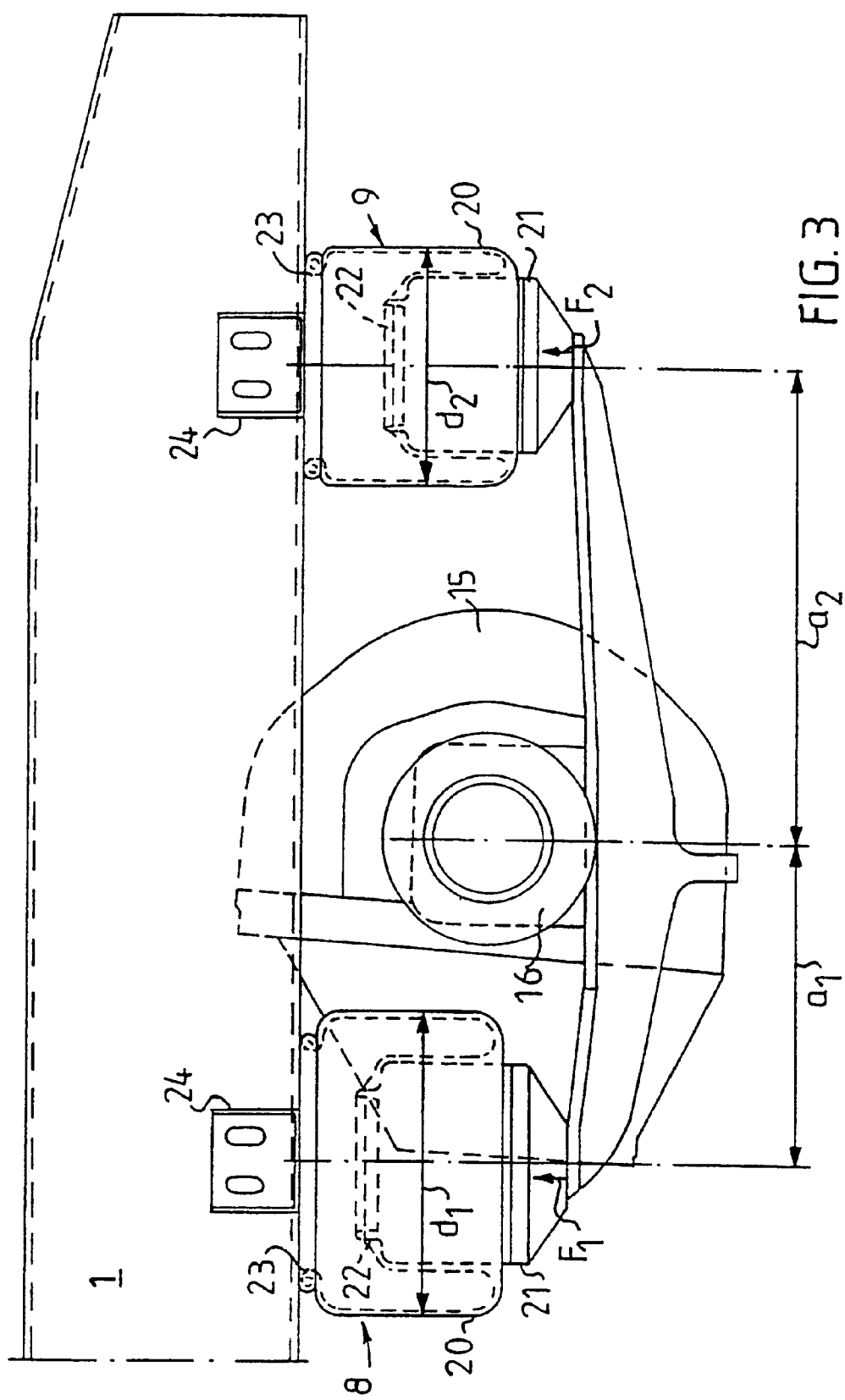

The invention will be described in more detail below with reference to examples shown in the accompanying drawings, where FIG. 1 shows a perspective view of a portion of a vehicle frame with one embodiment of a wheel suspension arrangement according to the invention for a wheel axle, FIG. 2 shows a corresponding perspective view of an embodiment for two wheel axles and FIG. 3 shows a simplified and enlarged side view of a portion of the wheel suspension arrangement in FIG. 1.

In FIG. 1, 1 and 2 designate the two rear portions of the left and right longitudinal frame beams, respectively, of a vehicle with air springs. The frame beams 1 and 2 are joined to each other via transverse beams 3 and 4, and they support a rear axle suspension arrangement, generally designated 5, for a rear axle (not shown). The rear axle suspension arrangement 5 comprises a pair of support members 6 and 7 for the rear axle. The frame beams 1 and 2 rest via air spring elements 8 and 9 on the support members 6 and 7, which are connected to the frame beams 1 and 2 via longitudinal torque rods 10 and anti-roll bars (not shown) and shock absorbers (not shown). Furthermore, the frame beams 1 and 2 are joined to the rear axle (not shown) via a V-shaped torque rod 13. The plate 14 on the torque rod 13 can, for example, be screwed fast to the differential housing 15, shown in FIG. 3, of the rear axle 16. FIG. 1 shows U-bolts 18 for securing a rear axle (not shown).

As can be seen in the Figures, the front air spring element 8 is of greater diameter $d_1$ and subsequently has a greater effective cross-sectional area than the rear air spring element 9 of diameter $d_2$. Assuming the same air pressure in the elements 8, 9, this will result in the front air spring element having a greater spring force $F_1$ than the rear element having a spring force $F_2$.

The air spring elements 8, 9 are of conventional construction and consist of a cylinder 20 of flexible material and a piston element 21, which is fixed to the edge 22 of the cylinder 20, the upper edge of which is jointed to a rigid plate 23 with a bracket 24, which is screwed securely, welded or riveted to the frame beam 1 or 2, respectively. The cylinder of the front air spring element 8 has its centre axis at a distance $a_1$ from the centre axis of the rear axle 16, and the cylinder 20 of the air spring element 9 has its centre axis at a distance $a_2$ from the centre axis of the rear axle, $a_2$ being greater than $a_1$.

According to the invention, $a_1 \times F_1$ should be equal to or at least approximately equal to $a_2 \times F_2$, to eliminate imbalance during the spring action. The asymmetry provides the advantage of better packing space for other system components. The total installation area on the frame side is also reduced, and this in certain cases involves a reduction in weight of the total installation.

The design in FIG. 2 differs from that shown in FIG. 1 by the addition of an additional wheel suspension 30 for a second wheel axle (not shown) is arranged in front of the wheel suspension 5. The wheel suspension 30 differs from the wheel suspension 5 only in that it is reversed relative to the wheel suspension 5.

What is claimed is:

1. Two-axle vehicle suspension arrangement comprising a pair of support members for each axle, means for fixing the wheel axles between the ends of each support member, and spring elements disposed at or in the vicinity of the ends of the support members and joining the support members to a frame, characterized in that the wheel axles are fixed in an axle position asymmetrically between the outer ends of the support members, and that the support members of one axle are reversed in relation to the support members of the other axle, so that the spring elements located closest to the respective axle position are directed towards each other, the spring elements being so selected that the spring force of the spring elements located closest to the axle position is greater than the spring force of the other spring elements located furthest from the axle position.

2. Two-axle vehicle suspension arrangement according to claim 1, characterized in that the product of the spring force and the distance from the axle position to the point of attachment of the spring element to the support member is at least approximately equal on both sides of the axle position.

3. Two-axle vehicle suspension arrangement according to claim 1, characterized in that the respective spring element is an air spring comprising a cylindrical air cushion with a jacket of elastic material, which at an upper end wall of rigid material has means for mounting in a vehicle frame, and a piston, which has an upper end fixed in an edge of the jacket folded into the interior of the cushion, and which has means for fixing to the support member, and that the air springs are arranged so that when one air spring is at its closest distance to the axle position that one air spring has an air cushion and a piston of greater cross-sectional area than the air cushion and piston of the other air spring located furthest from the axle position.

4. Two-axle vehicle suspension arrangement according to claim 2, characterized in that the respective spring element is an air spring comprising a cylindrical air cushion with a jacket of elastic material, which at an upper end wall of rigid material has means for mounting in a vehicle frame, and a piston, which has an upper end fixed in an edge of the jacket folded into the interior of the cushion, and which has means for fixing to the support member, and that the air springs are arranged so that when one air spring is at its closest distance to the axle position that one air spring has an air cushion and a piston of greater cross-sectional area than the air cushion and piston of the other air spring located furthest from the axle position.

* * * * *